United States Patent
Leshem et al.

(10) Patent No.: US 11,482,021 B2
(45) Date of Patent: Oct. 25, 2022

(54) ADAPTIVE SENSING BASED ON DEPTH

(71) Applicant: SCOPIO LABS LTD., Tel Aviv (IL)

(72) Inventors: Ben Leshem, Tel Aviv (IL); Eran Small, Yehud (IL); Itai Hayut, Tel Aviv (IL); Erez Na'Aman, Tel Aviv (IL); Eyal Ben-Bassat, Tel Aviv (IL)

(73) Assignee: SCOPIO LABS LTD., Tel Aviv (IL)

( * ) Notice: Subject to any disclaimer, the term of this patent is extended or adjusted under 35 U.S.C. 154(b) by 96 days.

(21) Appl. No.: 16/851,830

(22) Filed: Apr. 17, 2020

(65) Prior Publication Data

US 2020/0302144 A1 Sep. 24, 2020

Related U.S. Application Data

(63) Continuation of application No. PCT/IL2018/051117, filed on Oct. 18, 2018.
(Continued)

(51) Int. Cl.
*G06V 20/69* (2022.01)
*G01B 11/06* (2006.01)
(Continued)

(52) U.S. Cl.
CPC ............ *G06V 20/695* (2022.01); *G01B 11/06* (2013.01); *G01B 11/22* (2013.01); *G01N 21/251* (2013.01);
(Continued)

(58) Field of Classification Search
None
See application file for complete search history.

(56) References Cited

U.S. PATENT DOCUMENTS 10,558,029 B2  2/2020  Leshem
10,705,326 B2  7/2020  Small
(Continued)

FOREIGN PATENT DOCUMENTS

DE   10235656 A1   2/2004
EP   1610166 A1   12/2005
(Continued)

OTHER PUBLICATIONS

International Search Report, and Written Opinion for International Application No. PCT/IL2018/051117, 20 pages (dated Apr. 3, 2019).
(Continued)

*Primary Examiner* — Michelle M Entezari
(74) *Attorney, Agent, or Firm* — Fisherbroyles LLP; John Shimmick

(57) ABSTRACT

A microscope for adaptive sensing may comprise an illumination assembly, an image capture device configured to collect light from a sample illuminated by the assembly, and a processor. The processor may be configured to execute instructions which cause the microscope to capture, using the image capture device, an initial image set of the sample, identify, in response to the initial image set, an attribute of the sample, determine, in response to identifying the attribute, a three-dimensional (3D) process for sensing the sample, and generate, using the determined 3D process, an output image set comprising more than one focal plane. Various other methods, systems, and computer-readable media are also disclosed.

20 Claims, 11 Drawing Sheets

Related U.S. Application Data

(60) Provisional application No. 62/574,289, filed on Oct. 19, 2017.

(51) Int. Cl.
*G01B 11/22* (2006.01)
*G01N 21/25* (2006.01)
*G06V 10/56* (2022.01)
*G06V 10/141* (2022.01)
*G06V 20/64* (2022.01)

(52) U.S. Cl.
CPC ............ *G06V 10/141* (2022.01); *G06V 10/56* (2022.01); *G06V 20/647* (2022.01)

(56) References Cited

U.S. PATENT DOCUMENTS

| | | | |
|---|---|---|---|
| 2004/0109169 A1 | 6/2004 | Olschewski | |
| 2006/0007533 A1* | 1/2006 | Eichhorn | G02B 30/52 359/368 |
| 2007/0069106 A1* | 3/2007 | Krief | G02B 21/244 250/201.3 |
| 2010/0265323 A1* | 10/2010 | Perz | G02B 21/244 348/79 |
| 2015/0358533 A1* | 12/2015 | Tanaka | G02B 7/38 348/80 |
| 2016/0277675 A1* | 9/2016 | Lee | G02B 21/0036 |
| 2016/0306159 A1* | 10/2016 | Schnitzler | G02B 21/367 |
| 2017/0116734 A1* | 4/2017 | Van Leeuwen | G06K 9/4604 |
| 2018/0122092 A1* | 5/2018 | Stoppe | G06T 7/586 |
| 2018/0143214 A1* | 5/2018 | Bueren | H04N 5/247 |
| 2018/0348500 A1 | 12/2018 | Naaman, III | |
| 2018/0373016 A1 | 12/2018 | Leshem, III | |
| 2019/0235224 A1 | 8/2019 | Small | |
| 2019/0384962 A1 | 12/2019 | Hayut | |
| 2020/0041780 A1 | 2/2020 | Na'Aman | |
| 2020/0278362 A1 | 9/2020 | Hayut | |
| 2020/0278530 A1 | 9/2020 | Madar | |
| 2020/0302144 A1 | 9/2020 | Leshem | |
| 2021/0295482 A1* | 9/2021 | Rutenberg | G06V 20/693 |

FOREIGN PATENT DOCUMENTS

| | | |
|---|---|---|
| WO | 0043820 A1 | 7/2000 |
| WO | 2005119575 A2 | 12/2005 |
| WO | 2008028745 A1 | 3/2008 |
| WO | 2017081539 | 5/2017 |
| WO | 2017081540 | 5/2017 |
| WO | 2017081541 | 5/2017 |
| WO | 2017081542 | 5/2017 |
| WO | 2018078447 | 5/2018 |
| WO | 2018078448 | 5/2018 |
| WO | 2019077610 | 4/2019 |
| WO | 2019097523 | 5/2019 |
| WO | 2019097524 | 5/2019 |
| WO | 2020129064 | 6/2020 |
| WO | 2021095037 | 5/2021 |

OTHER PUBLICATIONS

Partial International Search Report for International Application No. PCT/IL2018/051117, 2 pages (dated Feb. 11, 2019).

* cited by examiner

Graph 500

_US 11,482,021 B2_

ADAPTIVE SENSING BASED ON DEPTH

RELATED APPLICATIONS

This application is a continuation of International Application No. PCT/IL2018/051117, filed Oct. 18, 2018, published as WO 2019/077610 on Apr. 25, 2019, which claims the benefit under 35 U.S.C. § 119(e) of U.S. Provisional Application No. 62/574,289, filed Oct. 19, 2017, entitled "ADAPTIVE SENSING BASED ON DEPTH", the disclosures of which are incorporated, in their entirety, by this reference.

BACKGROUND

The present disclosure relates generally to digital microscopy and/or computational microscopy and, more specifically, to systems and methods for adaptive sensing of a sample.

Today's commercial microscopes may rely on expensive and delicate optical lenses and typically rely on additional hardware to share and process acquired images. Moreover, for scanning optical microscopy, additional expensive equipment such as accurate mechanics and scientific cameras can be utilized. A new generation of microscope technology, known as computational microscopy, has begun to emerge, and makes use of advanced image-processing algorithms (usually with hardware modifications) to overcome limitations of conventional microscopes. For example, microscopic objectives often rely on a high optical resolution, therefore a high numerical aperture which may result in a very shallow depth of focus. The depth of focus may typically be in the order of microns or less for microscopic applications. However, some samples may not be thin enough to fit inside the depth of focus of the lens. This may result in one focused slice of the sample whereas the other slices are out of focus slices, which may appear blurred and add noise to the image. Moreover, more than one plane of focus may be present in the same field of view if the sample is not flat enough for the lens.

A conventional solution to this issue includes focus stacking (also referred to as Z-stacking). In focus stacking, the sample may be measured in a stack of different focal planes for which different slices of the sample are focused. For example, focus stacking may be based on defining a range for focus scanning and a region of interest (ROI) of the sample, and imaging the entire ROI at the defined range. The sample is scanned in several focal planes by changing the distance between the optics and the sample. However, focus stacking may disadvantageously be time consuming, as the measuring or acquisition time is multiplied by the number of focal planes inside the focus stack. Focus stacking may rely on increased data storage and with thicker samples, the resolution and quality of the image may deteriorate. For automatic microscopes, such as slide scanners, acquisition time may take longer than would be ideal. Also, for computational microscopy, the sampling time and computational time to generate images can be less than ideal.

SUMMARY

As will be described in greater detail below, the instant disclosure describes various systems and methods for adaptive sensing of a sample by detecting an attribute of the sample, and determining an acquisition process in response to the attribute. This adaptive approach to the image acquisition and computational process can decrease the acquisition time, storage requirements, costs and processing times. In addition, larger focus spans may be enabled where they are needed, thus improving the quality of the data and reducing a risk of human error in choosing the area and in analyzing the data.

The presently disclosed systems and methods relate to the fields of computational microscopy and digital microscopy. Some disclosed embodiments are directed to systems and methods for focusing a microscope using images acquired under a plurality of illumination conditions. The disclosed embodiments may also comprise systems and methods for acquiring images under a plurality of illumination conditions to generate a high-resolution image of a sample. Although reference is made to computational microscopy, the methods and apparatus disclosed herein will find application in many fields, such as 3D sampling with conventional microscopes, slide scanners and confocal microscopy.

In some embodiments, a microscope may comprise an illumination assembly, an image capture device configured to collect light from a sample illuminated by the illumination assembly, and a processor configured to execute instructions. The instructions may cause the microscope to capture, using the image capture device, an initial image set of the sample, identify, in response to the initial image set, an attribute of the sample, determine, in response to identifying the attribute, a three-dimensional (3D) process, and generate, using the determined 3D process, an output image set comprising more than one focal plane.

In some embodiments, the 3D process may comprise a process for sensing the sample. In some embodiments, the 3D process may comprise a reconstruction process for reconstructing the sample in response to the initial image set. In some embodiments, the 3D process may not rely on additional images beyond the initial image set.

In some embodiments, the 3D process may comprise capturing one or more subsequent images of the sample using one or more illumination conditions of the illumination assembly and one or more image capture settings for the image capture device. In some embodiments a number of illumination conditions for the 3D process is greater than a number of illumination conditions for capturing the initial image set. The 3D process may comprise determining a plurality of focal planes for capturing the one or more subsequent images based at least on the attribute, and the one or more illumination conditions and the one or more image capture settings correspond to the plurality of focal planes. The one or more subsequent images may be taken at one or more locations of the sample determined based at least on the attribute.

In some embodiments, the 3D process may comprise performing a 3D reconstruction of the sample based at least on a subset of images captured by the image capture device. The 3D process may comprise performing a 2.5D reconstruction of the sample based at least on a subset of images captured by the image capture device in order to generate 3D data from the sample.

In some embodiments, the 3D process comprises performing focus stacking for the sample based at least on a subset of images captured by the image capture device. The 3D process may comprise capturing a plurality of images at a respective plurality of focal planes.

In some embodiments, identifying the attribute may comprise estimating the attribute corresponding to one or more locations of the sample. The 3D process may be performed within a threshold time from capturing the initial image set.

The threshold time may be one of 5 microseconds, 10 microseconds, 1 second, 5 seconds, 10 seconds, 1 minute, or 5 minutes.

In some embodiments, the attribute may comprise a thickness of the sample at one or more locations of the sample. The attribute may comprise a depth of the sample at one or more locations of the sample.

In some embodiments, the 3D process may comprise capturing images at a plurality of distances between the image capture device and the sample, and a number of focal planes for the 3D process is greater than a number of distances in the plurality of distances.

In some embodiments, capturing the initial image set may comprise capturing the initial image set of the sample using a plurality of illumination conditions for illuminating the sample, and the plurality of illumination conditions comprise at least one of an illumination angle, an illumination wavelength, or an illumination pattern. The 3D process may comprise capturing one or more subsequent images of the sample using a plurality of illumination conditions for illuminating the sample, and the plurality of illumination conditions may comprise at least one of an illumination angle, an illumination wavelength, or an illumination pattern. The 3D process may comprise a plurality of focus levels for adjusting the image capture device.

In some embodiments, the attribute may comprise at least one of a thickness, a density, a depth, a color, a stain structure of the sample, a distance from a lens of the image capture device, a plurality of distances between the lens of the image capture device and the sample, a plurality of focal planes of the sample in relation to the image capture device, a sample structure, a convergence value, a pattern, or a frequency determined based at least on one of color analysis, analysis of optical aberrations, computational reconstruction, pattern recognition, Fourier transformation, or light field analysis.

In some embodiments, the sample may be stained and the color analysis may comprise determining the attribute for an area of the sample based at least on comparing a color or stain structure of the area with a color or stain structure of another area of the sample. The color analysis may comprise determining the attribute for an area of the sample based at least on comparing a color or stain structure of the area with a color or stain structure from empirical data. The sample may be stained using any stain, for example, it may be at least one of a Romanowsky stain, a Gram stain, a hematoxylin and eosin (H&E) stain, an immunohistochemistry (IHC) stain, a methylene blue stain, or a DAPI stain.

In some embodiments, the analysis of optical aberrations may comprise identifying an optical aberration from the initial image set, and determining, in response to identifying the optical aberration, the attribute. Determining, in response to identifying the optical aberration, the attribute may further comprise determining, in response to identifying the optical aberration, the sample's distance from the lens, and determining the attribute in response to determining the sample's distance from the lens.

In some embodiments, determining the 3D process may comprise determining the sample structure based at least on the computational reconstruction, and determining an illumination condition and an image capture setting in response to determining the sample structure. Determining the illumination condition and the image capture setting may comprise identifying, in response to the computational reconstruction, an area of the sample having a convergence value that indicates low convergence.

In some embodiments, the illumination assembly may comprise a laser and identifying the attribute may comprise identifying the pattern from illuminating the sample with the laser. Identifying the attribute comprises determining, using pattern recognition, the attribute of the sample.

In some embodiments, identifying the attribute may comprise performing the Fourier transformation using the initial image set, determining frequencies represented in the sample based at least on the Fourier transformation, and identifying the attribute in response to determining the frequencies.

In some embodiments, identifying the attribute may comprise performing the light field analysis in response to capturing the initial image set, and identifying the attribute by identifying characteristics of the light field analysis.

In some embodiments, capturing the initial image set may comprise capturing a first plurality of images, the 3D process may comprise capturing a second plurality of images, and a number of images in the second plurality of images may be greater than a number of images in the first plurality of images. The first plurality of images and the second plurality of images may correspond to a same area of the sample. The second plurality of images may be captured at a same relative location of the image capture device with respect to the sample as the first plurality of images. The 3D process may comprise a computational process based at least on capturing the initial image set.

In some embodiments, the illumination assembly may comprise an LED array. The illumination assembly may comprise one or more of a halogen lamp, an LED, an incandescent lamp, a laser or a sodium lamp. A resolution of the output image set may be higher than a resolution of the initial image set.

In some embodiments, the image capture device may comprise a plurality of image capture devices and the illumination assembly may comprise a plurality of illumination assemblies. The plurality of image capture devices may comprise a first image capture device and a second image capture device and the plurality of illumination assemblies may comprise a first illumination assembly and a second illumination assembly. The first illumination assembly may comprise a light source for backlight illumination and the second illumination assembly may comprise a plurality of light sources. The first image capture device may comprise a preview camera and the second image capture device may comprise a microscope objective and detector.

In one example, a method for adaptive sampling may comprise any combination of steps described herein.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
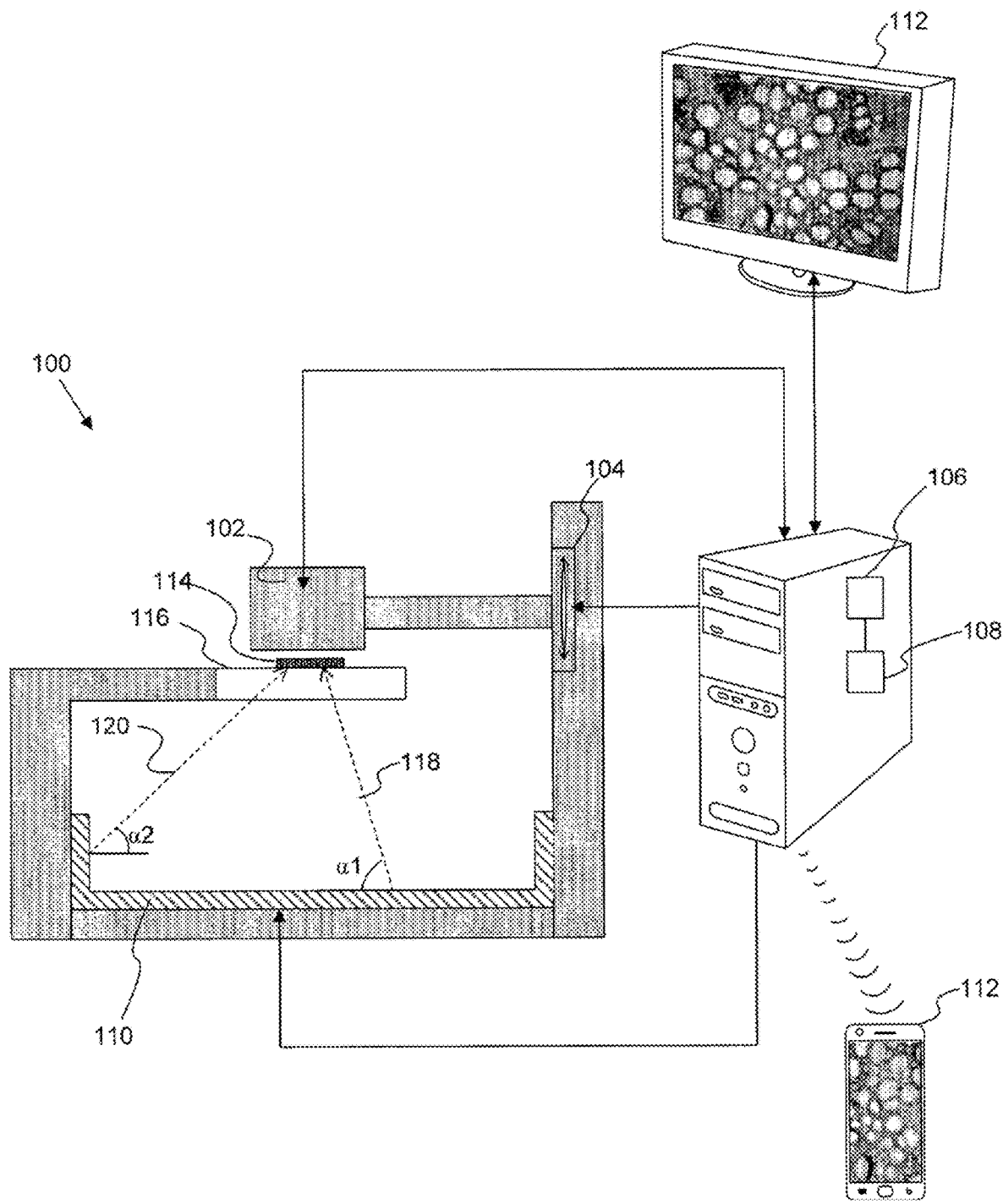
FIG. 1 is a diagram of an exemplary microscope, in accordance with some embodiments of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure is generally directed to systems and methods for adaptive sensing of a sample. As will be explained in greater detail below, embodiments of the instant disclosure may be configured to perform image captures using a larger focus depth or at several distances from the sample or locations or with added illumination conditions when it is determined to be necessary for imaging the sample, for example based on a detected attribute of the sample. The acquisition procedure and/or the computational process may be adapted. The resulting images may advantageously comprise most or all of the focus planes with important data at every point. Acquisition time may be significantly reduced by avoiding unnecessary image captures using focal planes which may not contribute additional data or by avoiding capturing images with illumination conditions which aren't necessary for the computational process. The user experience may be improved, for example, because the system may provide high-quality images without requiring the user to determine in advance how to adjust the acquisition procedure.

Tomography refers generally to methods where a three-dimensional (3D) sample is sliced computationally into several 2D slices. Confocal microscopy refers to methods for blocking out-of-focus light in the image formation which improves resolution and contrast but tends to lead to focusing on a very thin focal plane and small field of view. Both tomography and confocal microscopy as well as other methods used in 3D imaging may be used in conjunction with aspects of the present disclosure to produce improved results. Another method may be staggered line scan sensors, where the sensor has several line scanners at different heights and or angles, and the sensor may take images at several focus planes at the same time.

Figure 2A:
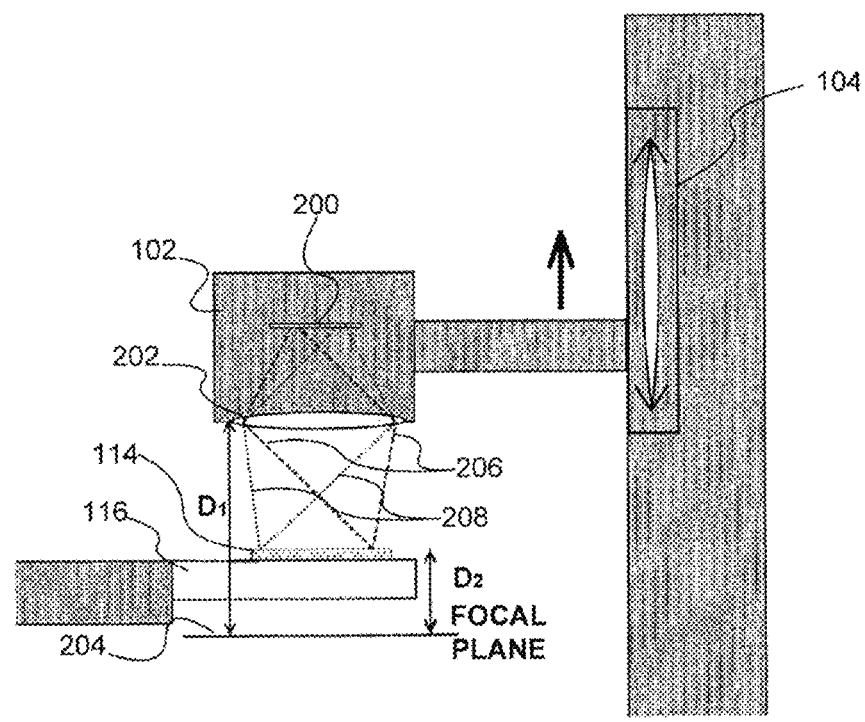
FIG. 2A is a diagram of the optical paths of two beam pairs when the microscope of FIG. 1. Is out of focus, in accordance with some embodiments of the present disclosure.
Figure 2B:
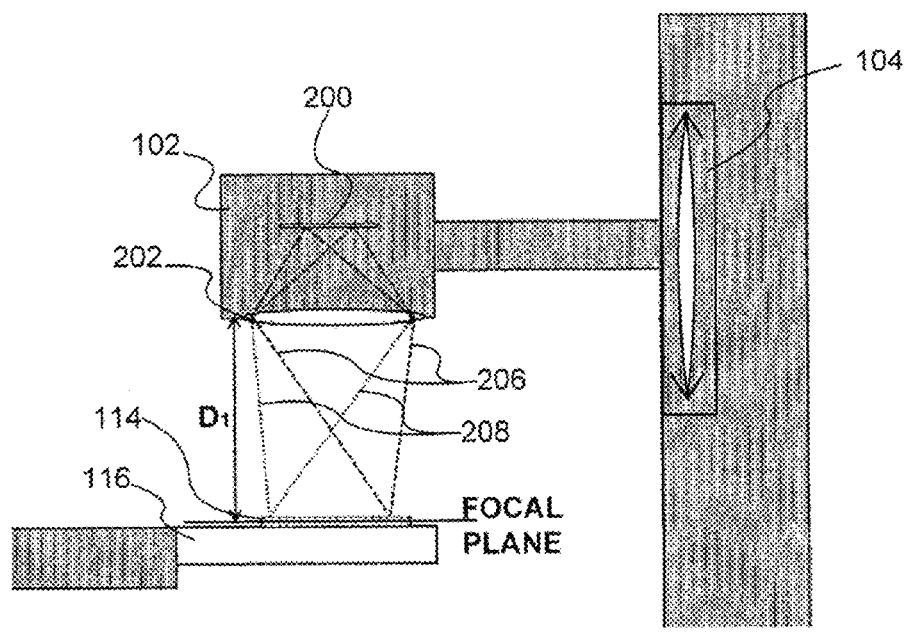
FIG. 2B is a diagram of the optical paths of two beam pairs when the microscope of FIG. 1 is in focus, in accordance with some embodiments of the present disclosure.
Figure 3:
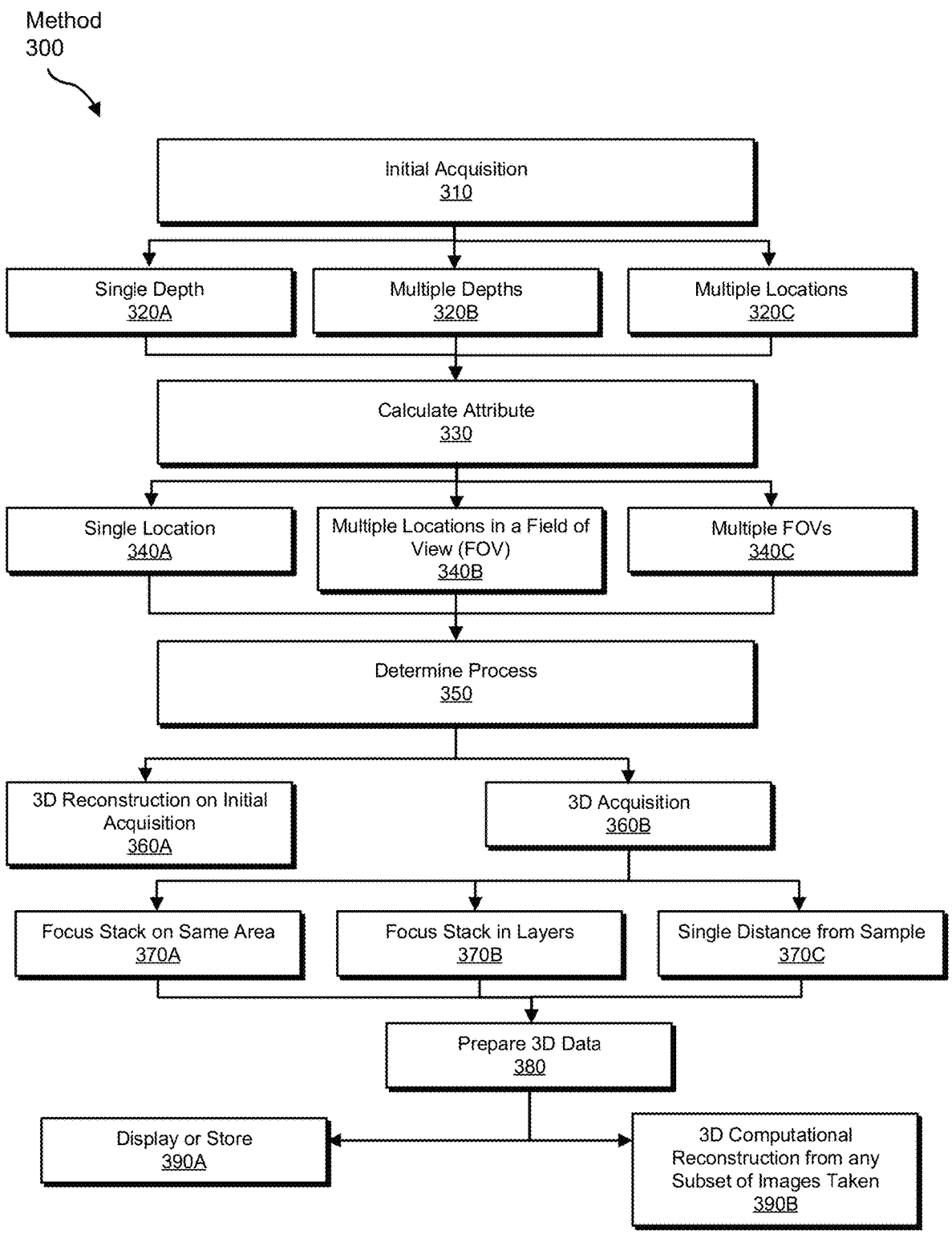
FIG. 3 is a workflow diagram showing an exemplary process for adaptive sensing of a sample, in accordance with some embodiments of the present disclosure.
Figure 4:
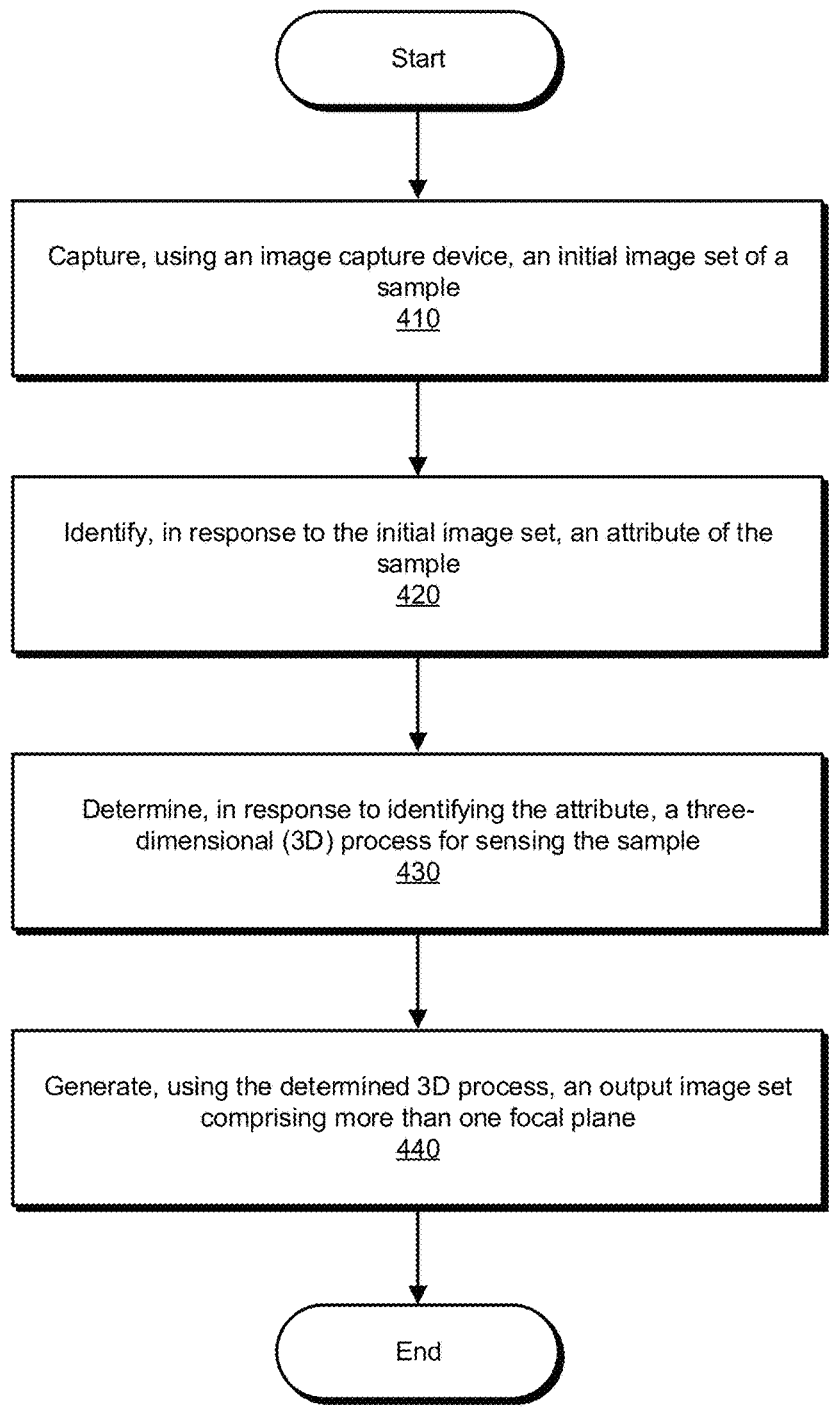
FIG. 4 is a flowchart showing an exemplary process for adaptive sensing of a sample, in accordance with some embodiments of the present disclosure.
Figure 5:
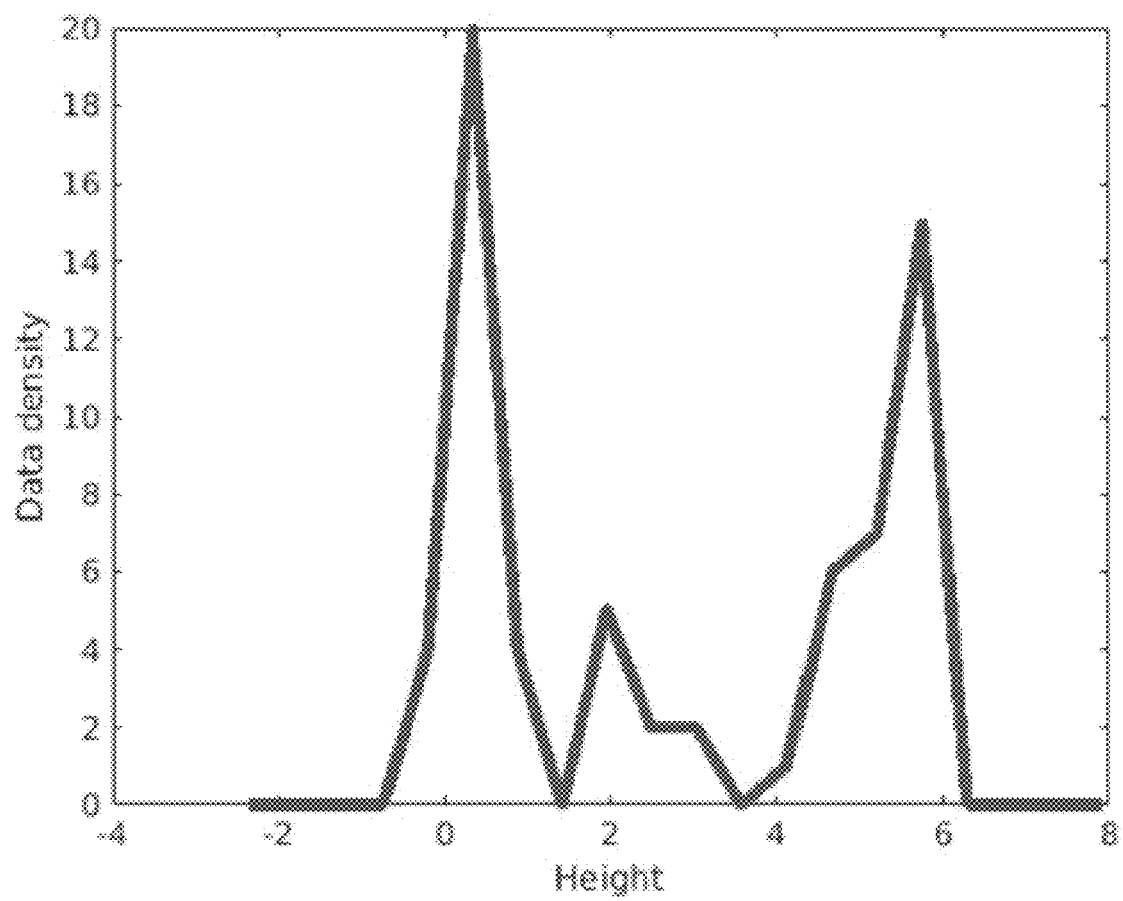
FIG. 5 is a graph corresponding to an initial acquisition of a sample, in accordance with some embodiments of the present disclosure.

The following will provide, with reference to FIGS. 1-8E, detailed descriptions of adaptive sensing. FIGS. 1, 2, and 7A-7E illustrate a microscope and various microscope configurations. FIGS. 3-4 illustrate exemplary processes for adaptive sensing of a sample. FIG. 5 shows an exemplary graph for attribute estimation. FIGS. 6A-6C illustrate exemplary images of a sample at different depths. FIG. 8A-8E illustrate exemplary sample geometries.

FIG. 1 is a diagrammatic representation of a microscope 100 consistent with the exemplary disclosed embodiments. The term "microscope" as used herein generally refers to any device or instrument for magnifying an object which is smaller than easily observable by the naked eye, i.e., creating an image of an object for a user where the image is larger than the object. One type of microscope may be an "optical microscope" that uses light in combination with an optical system for magnifying an object. An optical microscope may be a simple microscope having one or more magnifying lens. Another type of microscope may be a "computational microscope" that comprises an image sensor and image-processing algorithms to enhance or magnify the object's size or other properties. The computational microscope may be a dedicated device or created by incorporating software and/or hardware with an existing optical microscope to produce high-resolution digital images. As shown in FIG. 1, microscope 100 comprises an image capture device 102, a focus actuator 104, a controller 106 connected to memory 108, an illumination assembly 110, and a user interface 112. An example usage of microscope 100 may be capturing images of a sample 114 mounted on a stage 116 located within the field-of-view (FOV) of image capture device 102, processing the captured images, and presenting on user interface 112 a magnified image of sample 114.

Image capture device 102 may be used to capture images of sample 114. In this specification, the term "image capture device" as used herein generally refers to a device that records the optical signals entering a lens as an image or a sequence of images. The optical signals may be in the near-infrared, infrared, visible, and ultraviolet spectrums. Examples of an image capture device comprise a CCD camera, a CMOS camera, a photo sensor array, a video camera, a mobile phone equipped with a camera, a webcam, a preview camera, a microscope objective and detector, etc. Some embodiments may comprise only a single image capture device 102, while other embodiments may comprise two, three, or even four or more image capture devices 102. In some embodiments, image capture device 102 may be configured to capture images in a defined field-of-view (FOV). Also, when microscope 100 comprises several image capture devices 102, image capture devices 102 may have overlap areas in their respective FOVs. Image capture device 102 may have one or more image sensors (not shown in FIG. 1) for capturing image data of sample 114. In other embodiments, image capture device 102 may be configured to capture images at an image resolution higher than VGA, higher than 1 Megapixel, higher than 2 Megapixels, higher than 5 Megapixels, 10 Megapixels, higher than 12 Megapixels, higher than 15 Megapixels, or higher than 20 Megapixels. In addition, image capture device 102 may also be configured to have a pixel size smaller than 15 micrometers, smaller than 10 micrometers, smaller than 5 micrometers, smaller than 3 micrometers, or smaller than 1.6 micrometer.

In some embodiments, microscope 100 comprises focus actuator 104. The term "focus actuator" as used herein generally refers to any device capable of converting input signals into physical motion for adjusting the relative distance between sample 114 and image capture device 102. Various focus actuators may be used, including, for example, linear motors, electrostrictive actuators, electrostatic motors, capacitive motors, voice coil actuators, magnetostrictive actuators, etc. In some embodiments, focus actuator 104 may comprise an analog position feedback sensor and/or a digital position feedback element. Focus actuator 104 is configured to receive instructions from controller 106 in order to make light beams converge to form a clear and sharply defined image of sample 114. In the example illustrated in FIG. 1, focus actuator 104 may be configured to adjust the distance by moving image capture device 102.

However, in other embodiments, focus actuator 104 may be configured to adjust the distance by moving stage 116, or by moving both image capture device 102 and stage 116. Microscope 100 may also comprise controller 106 for controlling the operation of microscope 100 according to the disclosed embodiments. Controller 106 may comprise various types of devices for performing logic operations on one or more inputs of image data and other data according to stored or accessible software instructions providing desired functionality. For example, controller 106 may comprise a central processing unit (CPU), support circuits, digital signal processors, integrated circuits, cache memory, or any other types of devices for image processing and analysis such as graphic processing units (GPUs). The CPU may comprise any number of microcontrollers or microprocessors configured to process the imagery from the image sensors. For example, the CPU may comprise any type of single- or multi-core processor, mobile device microcontroller, etc. Various processors may be used, including, for example, processors available from manufacturers such as Intel®, AMD®, etc. and may comprise various architectures (e.g., x86 processor, ARM®, etc.). The support circuits may be any number of circuits generally well known in the art, including cache, power supply, clock and input-output circuits. Controller 106 may be at a remote location, such as a computing device communicatively coupled to microscope 100.

In some embodiments, controller 106 may be associated with memory 108 used for storing software that, when executed by controller 106, controls the operation of microscope 100. In addition, memory 108 may also store electronic data associated with operation of microscope 100 such as, for example, captured or generated images of sample 114. In one instance, memory 108 may be integrated into the controller 106. In another instance, memory 108 may be separated from the controller 106.

Specifically, memory 108 may refer to multiple structures or computer-readable storage mediums located at controller 106 or at a remote location, such as a cloud server. Memory 108 may comprise any number of random access memories, read only memories, flash memories, disk drives, optical storage, tape storage, removable storage and other types of storage.

Microscope 100 may comprise illumination assembly 110. The term "illumination assembly" as used herein generally refers to any device or system capable of projecting light to illuminate sample 114.

Illumination assembly 110 may comprise any number of light sources, such as light emitting diodes (LEDs), LED array, lasers, and lamps configured to emit light, such as a halogen lamp, an incandescent lamp, or a sodium lamp. In one embodiment, illumination assembly 110 may comprise only a single light source. Alternatively, illumination assembly 110 may comprise four, sixteen, or even more than a hundred light sources organized in an array or a matrix. In some embodiments, illumination assembly 110 may use one or more light sources located at a surface parallel to illuminate sample 114. In other embodiments, illumination assembly 110 may use one or more light sources located at a surface perpendicular or at an angle to sample 114.

In addition, illumination assembly 110 may be configured to illuminate sample 114 in a series of different illumination conditions. In one example, illumination assembly 110 may comprise a plurality of light sources arranged in different illumination angles, such as a two-dimensional arrangement of light sources. In this case, the different illumination conditions may comprise different illumination angles. For example, FIG. 1 depicts a beam 118 projected from a first illumination angle $\alpha 1$, and a beam 120 projected from a second illumination angle $\alpha 2$. In some embodiments, first illumination angle $\alpha 1$ and second illumination angle $\alpha 2$ may have the same value but opposite sign. In other embodiments, first illumination angle $\alpha 1$ may be separated from second illumination angle $\alpha 2$. However, both angles originate from points within the acceptance angle of the optics. In another example, illumination assembly 110 may comprise a plurality of light sources configured to emit light in different wavelengths. In this case, the different illumination conditions may comprise different wavelengths. In yet another example, illumination assembly 110 may configured to use a number of light sources at predetermined times. In this case, the different illumination conditions may comprise different illumination patterns. Accordingly and consistent with the present disclosure, the different illumination conditions may be selected from a group including: different durations, different intensities, different positions, different illumination angles, different illumination patterns, different wavelengths, or any combination thereof.

Consistent with disclosed embodiments, microscope 100 may comprise, be connected with, or in communication with (e.g., over a network or wirelessly, e.g., via Bluetooth) user interface 112. The term "user interface" as used herein generally refers to any device suitable for presenting a magnified image of sample 114 or any device suitable for receiving inputs from one or more users of microscope 100. FIG. 1 illustrates two examples of user interface 112. The first example is a smartphone or a tablet wirelessly communicating with controller 106 over a Bluetooth, cellular connection or a Wi-Fi connection, directly or through a remote server. The second example is a PC display physically connected to controller 106. In some embodiments, user interface 112 may comprise user output devices, including, for example, a display, tactile device, speaker, etc. In other embodiments, user interface 112 may comprise user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100. User interface 112 may be connected (physically or wirelessly) with one or more processing devices, such as controller 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc.

Microscope 100 may also comprise or be connected to stage 116. Stage 116 comprises any horizontal rigid surface where sample 114 may be mounted for examination. Stage 116 may comprise a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may comprise a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the XY plane to enable imaging of multiple areas of the sample.

FIG. 2A and FIG. 2B depict a closer view of microscope 100 in two cases. Specifically, FIG. 2A illustrates the optical paths of two beams pairs when microscope 100 is out of focus, and FIG. 2B illustrates the optical paths of two beams pairs when microscope 100 is in focus. In cases where the sample is thicker than the depth of focus or the change in depth is rapid, some portions of the sample may be in focus, while other portions may not be in focus.

As shown in FIGS. 2A and 2B, image capture device 102 comprises an image sensor 200 and a lens 202. In microscopy, lens 202 may be referred to as an objective lens of microscope 100. The term "image sensor" as used herein generally refers to a device capable of detecting and converting optical signals into electrical signals. The electrical signals may be used to form an image or a video stream based on the detected signals. Examples of image sensor 200 may comprise semiconductor charge-coupled devices (CCD), active pixel sensors in complementary metal-oxide-semiconductor (CMOS), or N-type metal-oxide-semiconductor (NMOS, Live MOS). The term "lens" as used herein refers to a ground or molded piece of glass, plastic, or other transparent material with opposite surfaces either or both of which are curved, by means of which light rays are refracted so that they converge or diverge to form an image. The term "lens" may also refer to an element containing one or more lenses as defined above, such as in a microscope objective. The lens is positioned at least generally transversely of the optical axis of image sensor 200. Lens 202 may be used for concentrating light beams from sample 114 and directing them towards image sensor 200. In some embodiments, image capture device 102 may comprise a fixed lens or a zoom lens.

When sample 114 is located at a focal-plane 204, the image projected from lens 202 is completely focused. The term "focal-plane" is used herein to describe a plane that is perpendicular to the optical axis of lens 202 and passes through the lens's focal point. The distance between focal-plane 204 and the center of lens 202 is called the focal length and is represented by D1. In some cases, sample 114 may not be completely flat, and there may be small differences between focal-plane 204 and various regions of sample 114. Accordingly, the distance between focal-plane 204 and sample 114 or a region of interest (ROI) of sample 114 is marked as D2. The distance D2 corresponds with the degree in which an image of sample 114 or an image of ROI of sample 114 is out of focus. For example, distance D2 may be between 0 and about 3 mm. In some embodiments, D2 may be greater than 3 mm. When distance D2 equals to zero, the image of sample 114 (or the image of ROI of sample 114) is completely focused. In contrast, when D2 has a value other than zero, the image of sample 114 (or the image of ROI of sample 114) is out of focus.

FIG. 2A depicts a case where the image of sample 114 is out of focus. For example, the image of sample 114 may be out of focus when the beams of light received from sample 114 do not converge on image sensor 200. FIG. 2A depicts a beams pair 206 and a beams pair 208. Neither pair converges on image sensor 200. For the sake of simplicity, the optical paths below sample 114 are not shown. Consistent with the present disclosure, beams pair 206 may correspond with beam 120 projected from illumination assembly 110 at illumination angle α2, and beams pair 208 may correspond with beam 118 projected from illumination assembly 110 at illumination angle α1. In addition, beams pair 206 may concurrently hit image sensor 200 with beams pair 208. The term "concurrently" in this context means that image sensor 200 has recorded information associated with two or more beams pairs during coincident or overlapping time periods, either where one begins and ends during the duration of the other, or where a later one starts before the completion of the other. In other embodiments, beams pair 206 and beams pair 208 may sequentially contact image sensor 200. The term "sequentially" means that image sensor 200 has started recording information associated with, for example, beam pair 206 after the completion of recording information associated with, for example, beam pair 208.

As discussed above, D2 is the distance between focal-plane 204 and sample 114, and it corresponds with the degree in which sample 114 is out of focus. In one example, D2 may have a value of 50 micrometers. Focus actuator 104 is configured to change distance D2 by converting input signals from controller 106 into physical motion. In some embodiments, in order to focus the image of sample 114, focus actuator 104 may move image capture device 102. In this example, to focus the image of sample 114 focus actuator 104 may move image capture device 102 50 micrometers up. In other embodiments, in order to focus the image of sample 114, focus actuator 104 may move stage 116 down. Therefore, in this example, instead of moving image capture device 102 50 micrometers up, focus actuator 104 may move stage 116 50 micrometers down.

FIG. 2B illustrates a case where the image of sample 114 is in focus. In this case, both beam pairs 206 and 208 converge on image sensor 200, and distance D2 equals to zero. In other words, focusing the image of sample 114 (or the image of ROI of sample 114) may rely on adjusting the relative distance between image capture device 102 and sample 114. The relative distance may be represented by D1-D2, and when distance D2 equals to zero, the relative distance between image capture device 102 and sample 114 equals to distance D1, which means that the image of sample 114 is focused.

FIG. 3 illustrates an exemplary workflow 300 for adaptive sensing of a sample, such as sample 114, using a microscope, such as microscope 100. Samples on a slide may have varying or otherwise non-homogeneous thickness and/or flatness, or a homogenous thickness but unknown prior to the acquisition, which may complicate imaging the samples. Samples may have varying thicknesses based on type of sample. Examples of samples include but are not limited to blood, fine needle aspirates (FNA), histopathology tissue samples, frozen sections, sperm, PAP smear, fecal, urine, petroleum, cream, algae, and brain slices. Blood samples may be smeared, which may result in some areas being thinner or thicker than other areas of the sample. Thin samples may be approximately 2 microns in thickness. Thick areas may be approximately 10 or more microns.

FNA samples may be made using fluid and/or soft material from a syringe, which may be sprayed and smeared on a slide. FNA samples may typically have randomly dispersed thick areas, which may be more difficult to image and analyze. FNA samples may have thicknesses ranging from 2 microns to 20 or more microns.

Tissue samples used for histopathology may typically be embedded with paraffin. These tissue samples may be cut with a microtome. These tissue samples may have thicknesses ranging from two microns to ten microns, with three microns to six microns being very common. However, they may occasionally be cut thicker.

Frozen section tissue samples may be frozen in order to facilitate processing. Frozen section tissue samples may be thicker than histopathology samples due to technical difficulties. Although thicknesses ranging from four microns to six microns may be desirable, samples may be ten microns to thirty or more microns.

Brain slices may sometimes be cut thicker than other sample types. For example, brain slices may have thicknesses of 5-50 microns, but may even have thicknesses ranging from 50-100 microns, and may be as thick as 200 microns.

Figure 8A:
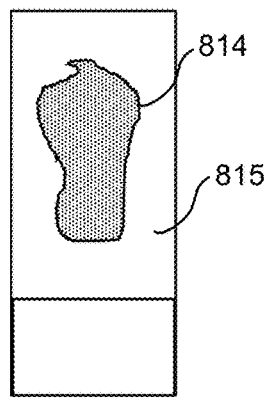
FIG. 8A is a top-down view of a sample in accordance with some embodiments of the present disclosure.

FIGS. 8A-8E illustrate possible sample geometries of a sample 814, which may correspond to sample 114. Sample 814 may be mounted on a slide 815, which may be a slide suitable for mounting on a microscope. FIG. 8A shows a top-down view of sample 814, which also illustrates how the sample geometry may not be easily determined without an initial acquisition of the sample. In some embodiments, the microscope comprises a depth of field inside the field of view of the microscope, and the sample is imaged along a layer 817 corresponding to the depth of field of the microscope. The entire area of the sample imaged at a given moment can be within layer 817, e.g. a 2D sample, or the sample can extend beyond the layer 817 corresponding to the depth of field of the microscope, e.g. 2.5 D and 3D samples.

Figure 8B:
FIG. 8B is a side view of the sample of FIG. 8A when the sample is a 2D sample.
Figure 8C:
FIG. 8C is a side view of the sample of FIG. 8A when the sample is a 2.5D sample.
Figure 8D:
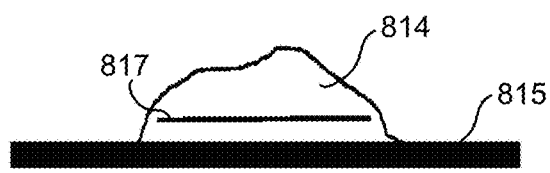
FIG. 8D is a side view of the sample of FIG. 8A showing a single layer when the sample is a 3D sample.
Figure 8E:
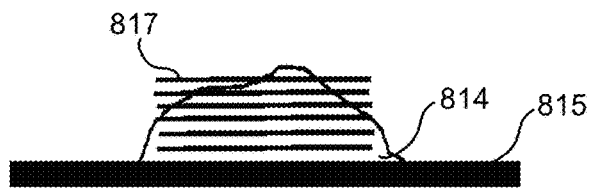
FIG. 8E is a side view of the sample of FIG. 8A showing multiple layers when the sample is a 3D sample.

FIG. 8B shows sample 814 having a 2D geometry. In this example, a single layer 817 may be used to capture sample 814. Layer 817 may correspond to a depth of field of a focal plane. FIG. 8C shows sample 814 having a 2.5D geometry. As seen in FIG. 8C, a single layer 817 may capture much of sample 814 in focus, but may miss some portions, such as the peaks and valleys extending outside of layer 817. To properly capture sample 814 in FIG. 8C, a 2.5D reconstruction may rely on additional images corresponding to the portions outside of layer 817. For instance, additional layers 817 may be used. However, additional efficiency may be gained by determining where the peaks and valleys are located (e.g., based on an attribute of sample 814) to specifically target the missing portions, according to embodiments described herein. FIGS. 8D and 8E show sample 814 having a 3D geometry. In FIG. 8D, a single layer 817 may be sufficient to capture the information in sample 814 which is of interest for a certain case. The 3D process may be used to enable imaging that layer without interference from the other parts of the sample. As seen in FIG. 8E, multiple layers 817 may be used to cover the depth range of sample 814. A 3D reconstruction may reconstruct layers 817 to produce an output image for sample 814. However, additional efficiency may be gained by specifically selecting layers 814 based on the attribute of sample 814. For example, the topmost layer 817 may only cover a small portion of sample 814, and therefore may be reduced in size.

At block 310, the microscope performs an initial acquisition of the sample. The microscope may capture images of the sample at a single depth 320A, multiple depths 320B, and/or multiple locations 320C. Single depth 320A may comprise capturing images using one or more illuminations at a single depth of the sample. Similarly, multiple depths 320B may comprise capturing images using one or more illuminations at multiple depths of the sample. Multiple locations 320C may comprise capturing images using one or more illuminations at multiple locations of the sample.

The sample may be scanned with some granularity in order to estimate an attribute, such as thickness, depth, and/or density, at different locations and to further determine a benefit from acquiring and/or calculating information about a larger depth of the sample. In addition, the acquired images may be part of a computational reconstruction of the sample, using a computational reconstruction algorithm such a two dimensional (2D), 2.5D, or 3D reconstruction to analyze the sample. Whereas 3D reconstruction may reconstruct a sample having 3D shapes and/or features, 2.5D reconstruction may reconstruct a sample having a generally thin, flat shape but uneven or non-smooth, similar to a crumpled sheet of paper. An example of that may be a histopathology slice of a tissue, which may not have been placed completely flat on the surface of the slide.

At block 330, the microscope may calculate an attribute of the sample, which could indicate that the sample has 2.5D or 3D structure, and therefore may require more than one focal plane. The attribute may be calculated for a single location 340A, multiple locations in a field of view ("FOV") 340B, and/or multiple FOVs 340C. The attribute may comprise a thickness, a depth, a density, a color, a stain structure of the sample (e.g., a structure formed or made visible when sample is stained), one or more distances from a lens, one or more focal planes of the sample, a sample structure of the sample, a convergence value, a pattern, or a frequency represented by the sample, in one or more locations of the sample. The attribute may be calculated in various ways.

The depth of the sample may be determined from physical attributes of the acquisition or the image attributes resulting from the physical attributes of, for instance, defocus. For example, a sharpness level in the image at one location may be compared with a sharpness level at other locations of the captured image or a threshold sharpness value. In another example, the sample may have been illuminated from different angles. A difference in shift of features under the different illumination angles may be used to calculate the depth.

The depth of the sample, or the benefit from additional depth information may be determined from the contents of the image. For example, a particular feature or object, such as a specific type of cell (e.g., white blood cells in a blood smear sample) may be recognized in an area of the image. The recognized feature may indicate the depth, and/or may indicate the benefit from additional depth information. For example, the feature may be larger than what was initially captured or may be a feature of interest. The acquisition process may be adapted to acquire additional images in several focus planes near the feature or acquire information to perform a 3D reconstruction in order to assure the feature is in perfect focus and to obtain the 3D information at that location.

The sample may be stained using, for example, a Romanowsky stain, a Gram stain, a hematoxylin and eosin (H&E) stain, an immunohistochemistry (IHC) stain, a methylene blue stain, a DAPI stain, a fluorescent stain, or any other suitable stain.

Image analysis may be used, for example on preview or magnified images, to determine the attribute. A color, a contrast, an edge, a diffraction, and/or an absorption may be analyzed in the images. Different parts of the sample may respond differently to staining or illumination with different wavelengths or may otherwise appear different in imaging due to changes in focus and/or other characteristics. These differences may be used to estimate which areas of the sample are thicker or thinner than others. For example, if an area is darker than its surroundings, the area may be thicker than its surroundings. Moreover, knowledge from previously analyzed samples and/or prior analysis may be available. For example, some samples made by a consistent process, such as blood samples made with a stainer. More accurate results may be achieved by using the prior analysis.

The attribute may be determined from changes in aberrations. When samples are in different focal planes, the optics may introduce different optical aberrations. These aberrations may produce artifacts in the images, such as stretching, contracting, shifting, etc. The aberrations may suggest the sample's distance from the lens, which may be used to estimate the depth and/or thickness of the sample. In addition, the pupil function of the optics at each location may be used directly.

The attribute may be determined using computational reconstruction. For example, the sample may be analyzed using the results from a computational reconstruction algorithm (such as 2D, 2.5D, or 3D reconstruction) applied to the initial acquisition. For instance, 3D reconstruction may be used with a fewer number of layers than would be utilized for a complete 3D reconstruction in order to assess a structure of the sample. Additional layers and/or illumination conditions as well as locations for the additional layers may be determined based on the structure of the sample.

The attribute may be determined using values of convergence. Reconstruction algorithms may track the algorithm's convergence. Places of low convergence may indicate thick or complex areas which may benefit from further imaging.

The attribute may be determined using a laser. The sample may be illuminated using one or more lasers. The resulting patterns may be analyzed to determine the attribute.

The attribute may be determined using pattern recognition, such as computer vision or deep learning. For known types of samples, a database of expected patterns and shapes in images may be available. For instance, a white blood cell's appearance when covered by different thicknesses of other fluids in an FNA sample may be available and a subsequent FNA sample may be analyzed based on the expected patterns to determine the attribute.

The attribute may be determined from the properties of a Fourier transformation of the images. The Fourier transformation of the images may reveal the frequencies represented in the images. Thick samples may have less high frequencies because of the multiple scatters of light. An "envelope" of decreased of energy with increasing frequencies may suggest thickness. A change of frequencies between adjacent tiles of an image may indicate differences between the tiles.

The attribute may be determined from digital refocusing using light field analysis. Light field analysis may be based on knowledge of the conditions under which the images were taken to form a basic refocusing approximation. The resultant refocusing approximation may be used to estimate the thickness and location of the sample.

The attribute may be determined from the statistics of lateral shifts in areas of the images. Changes in focus may result in lateral shifts of details. Analyzing how changes in focus affect different areas in the images may be used to determine local depth.

The attribute may be determined using machine learning (e.g., neural networks, convolutional neural networks, deep learning, computer vision, etc.). A database of images under known acquisition conditions may be used to train a machine learning algorithm to identify the thickness and/or location of the sample.

At block 350, the microscope may determine a process for adapting the acquisition process. The process may be an acquisition procedure that may perform 3D measurement, such as focus stacking or 3D reconstruction. The process may comprise a 3D reconstruction on initial acquisition 360A, which in some embodiments may be a continuation of the initial acquisition. In other words, the initial acquisition may be part of the 3D reconstruction process. The process may comprise a 3D acquisition 360B, such as focus stacking. The process may be performed after or concurrently with the attribute estimation.

The attribute, such as thickness and/or density in different locations of the sample, may be used to determine where to place additional layers and/or voxels for 2.5D analysis or 3D analysis. 3D acquisition may comprise, for example, focus stack on a same lateral area 370A, focus stack in layers 370B, and/or a single distance from the sample 370C. Thus, the 3D acquisition 360B may be able to analyze different focal planes in a field of view, expand autofocus parameters for 2.5D and 3D samples, and determine a location of maximum data in a thick sample etc.

At block 380, 3D data may be prepared. For example, the 3D data may be registered so the layers are in the correct relative locations or use image processing to improve the display or creating an "all in focus" image for cases such as 2.5D samples. When the 3D data has been prepared, the data may be displayed or stored as shown at block 390A. The 3D computational reconstruction can be performed from any subset of images taken as shown at block 390B. For example, a 3D reconstruction process may be started, modified, and completed.

The workflow 300 may comprise a method for adaptive sensing of the sample, and each of the blocks of workflow 300 may comprise steps of the method for adaptive sensing of the sample.

FIG. 4 is a flowchart of an exemplary process 400 for determining adaptive sensing, for example, sample 114. The steps of process 400 may be performed by a microscope, such as an autofocus microscope. The term "autofocus microscope" as used herein generally refers to any device for magnifying sample 114 with the capability to focus the image of sample 114 (or the image of ROI of sample 114) in an automatic or semiautomatic manner. In the following description, reference is made to components of microscope 100 for purposes of illustration. It will be appreciated, however, that other implementations are possible and that other components may be utilized to implement the example process.

At step 410, image capture device 102 may be used to capture an initial image set of sample 114. Capturing the initial image set may comprise capturing more than one image, such as a first plurality of images. For example, a plurality of illumination conditions for illumination assembly 110 to illuminate sample 114. Examples or illumination conditions comprise illumination angles, illumination wavelengths, or illumination patterns. The illumination conditions and image capture settings may be default settings for microscope 100, or may be default settings based on the type of sample 114. The default settings may correspond to settings which may minimize how many initial images are captured to determine an attribute of sample 114. The default settings may correspond to preliminary steps of a 3D measurement process. Alternatively, the default settings may be determined by a user.

At step 420, controller 106 may identify, in response to the initial image set, an attribute of sample 114. The attribute may correspond to one or more aspects of sample 114. In some cases, several attributes may be determined, for example, the depth (e.g., distance of the sample or certain layers of the sample from the microscope) and thickness of the sample in the analysis process may be determined. The attribute may comprise a thickness of sample 114 at one or more locations. The attribute may comprise a depth of sample 114 at one or more locations. The attribute may comprise a density of sample 114 at one or more locations. Other attributes of sample 114 may comprise a color, a stain structure of sample 114 (e.g., a structure formed or made visible when sample 114 is stained), a distance from lens 202 of image capture device 102, a plurality of distances between lens 202 and sample 114, a plurality of focal planes of sample 114 in relation to image capture device 102, a sample structure of sample 114, a convergence value, a pattern, or a frequency determined based at least on one of color analysis, analysis of optical aberrations, computational reconstruction, pattern recognition, Fourier transformation, or light field analysis.

In some embodiments, sample 114 may be stained using, for example, a Romanowsky stain, a Gram stain, a hematoxylin and eosin (H&E) stain, an immunohistochemistry (IHC) stain, a methylene blue stain, a DAPI stain, a fluorescent stain, or any other suitable stain. When sample 114 is stained, controller 106 may perform color analysis to determine the attribute of sample 114. For example, the attribute for an area of sample 114 may be determined based on comparing a color or stain structure of the area with a color or stain structure of another area of the sample. In other examples, the attribute for the area may be determined based on comparing the color or stain structure of the area with a color or stain structure from empirical data. For instance, memory 108 may comprise a database of colors and/or stain structures and how they may correlate to attributes. The comparison of colors and/or stain structures may be based on pattern recognition, machine learning, or any other suitable comparison process.

In some embodiments, controller 106 may perform analysis of optical aberrations to determine the attribute of sample 114. This analysis may comprise identifying an optical aberration from the initial set and determining, in response to identifying the optical aberration, the attribute. For example, controller 106 may determine a distance of sample 114 from lens 202 in response to identifying the optical aberration. Controller 106 may then determine the attribute in response to determining this distance.

In some embodiments, identifying the attribute may comprise using pattern recognition. For example, illumination assembly 110 may illuminate sample 114 with a laser, and controller 106 may perform pattern recognition on the resulting pattern to identify the attribute.

In some embodiments, identifying the attribute may comprise performing a Fourier transformation. For example, controller 106 may perform the Fourier transformation using the initial image set. Controller 106 may then determine frequencies represented in sample 114 based at least on the Fourier transformation. Controller 106 may identify the attribute in response to determining the frequencies.

In some embodiments, identifying the attribute may comprise performing a light field analysis. For example, in response to capturing the initial image set, controller 106 may perform the light field analysis. The initial image set may have been illuminated under particular illumination settings, for example by a laser of illumination assembly 110. Controller 106 may then identify the attribute by identifying characteristics of the light field analysis.

In addition, calculating the attribute may comprise estimating the attribute corresponding to one or more locations of sample 114 as described herein. For example, the attribute may refer to one or more specific points and/or areas of sample 114.

At step 430, controller 106 may determine, in response to identifying the attribute, a three-dimensional (3D) process for sensing sample 114. The 3D process may comprise a process for sensing the sample. In some embodiments, the 3D process may comprise a reconstruction process, such as a 3D reconstruction process, for reconstructing the sample in response to the initial image set. In some examples, the 3D process may not require images beyond the initial image set.

In some embodiments, determining the 3D process may comprise controller 106 determining the sample structure based at least on the computational reconstruction, and determining an illumination condition and an image capture setting in response to determining the sample structure.

The term "sample structure" as used herein may refer to a structure and/or structural features of the sample, including, for example, biomolecules, whole cells, portions of cells such as various cell components (e.g., cytoplasm, mitochondria, nucleus, chromosomes, nucleoli, nuclear membrane, cell membrane, Golgi apparatus, lysosomes), cell-secreted components (e.g., proteins secreted to intercellular space, proteins secreted to body fluids, such as serum, cerebrospinal fluid, urine), microorganisms, and more. Controller 106 may determine the illumination condition and the image capture setting based on a benefit from capturing additional detail at a location of the sample structure. Determining the illumination condition and the image capture setting may also comprise identifying, in response to the computational reconstruction, an area of the sample having a convergence value that indicates low convergence.

At step 440, controller 106 may generate, in response to identifying the attribute, an output image set comprising more than one focal plane using a three-dimensional (3D) process. The 3D process may comprise a computational process based at least on capturing the initial image set. For example, the 3D process may be a continuation of a computational process that started with capturing the initial image set.

In some embodiments, the 3D process may comprise capturing one or more subsequent images of the sample using one or more illumination conditions of illumination assembly 110 and one or more image capture settings for image capture device 102. A number of illumination conditions for the 3D process may be greater than a number of illumination conditions for capturing the initial image set.

In some embodiments, the 3D process may comprise determining a plurality of focal planes for capturing the one or more subsequent images based at least on the attribute. The one or more illumination conditions and the one or more image capture settings may correspond to the plurality of focal planes. The one or more subsequent images may be taken at one or more locations of the sample determined based at least on the attribute. For example, the attribute may indicate one or more ROIs. Controller 106 may have determined focal planes to ensure that all ROIs can be captured in focus.

In some embodiments, the 3D process may comprise performing a 3D reconstruction of the sample based at least on a subset of images captured by the image capture device. In some embodiments, the 3D process may comprise performing a 2.5D reconstruction of the sample based at least on a subset of images captured by the image capture device in order to generate 3D data from the sample. In other words, the 3D process may not be restricted to 3D reconstructions.

In some embodiments, the 3D process comprises performing focus stacking for the sample based at least on a subset of images captured by the image capture device. For example, the 3D process may comprise capturing a plurality of images at a respective plurality of focal planes. In some embodiments, the 3D process may comprise capturing images at a plurality of distances between the image capture device and the sample. A number of focal planes for the 3D process may be greater than a number of distances in the plurality of distances. However, controller 106 may determine the number of focal planes to efficiently capture ROIs of sample 114, without using extraneous focal planes and also without neglecting any ROI. In some embodiments, the 3D process may comprise a plurality of focus levels for adjusting the image capture device.

In some embodiments, the 3D process may comprise capturing one or more subsequent images of the sample using a plurality of illumination conditions for illuminating the sample. The plurality of illumination conditions may comprise at least one of an illumination angle, an illumination wavelength, or an illumination pattern. The illumination conditions may be determined based on the attribute, for example, to ensure that ROIs are properly captured with sufficient detail.

In some embodiments, the 3D process may comprise capturing a second plurality of images. A number of images in the second plurality of images may be greater than a number of images in the first plurality of images. In some embodiments, the first plurality of images and the second plurality of images may correspond to a same area of the sample. In some embodiments, the second plurality of images may be captured at a same relative location of the image capture device with respect to the sample as the first plurality of images. For example, controller 106 may capture a minimal number of images for the initial image set in order to minimize extraneous captures. Controller 106 may detect the attribute and determine that the initial image set insufficiently captures the ROIs of sample 114. Controller 106 may then determine how many additional images can be used to sufficiently capture sample 114.

In some embodiments, the 3D process may be performed within a threshold time from capturing the initial image set. The threshold time may be one of 5 microseconds, 10 microseconds, 1 second, 5 seconds, 10 seconds, 1 minute, 3 minutes or 5 minutes, or within a range defined by any two of the preceding values. For example, the threshold time can be within a range from 5 microseconds to 10 second, from 5 microseconds to 1 minute, from 5 microseconds to 3 minutes, or 5 microseconds to 5 minutes. In some embodiments, the 3D process may be performed concurrently with capturing the initial image set, or the 3D process may comprise the initial image set.

Any of the steps of method 400 can be combined with any method step corresponding to a block of workflow 300 as described herein.

FIG. 5 illustrates a graph 500 which may represent an identified attribute. The initial image set may comprise images taken at various heights, corresponding to the height axis or may comprise a set of images corresponding to illumination conditions. The data density axis may correspond to the attribute. For example, higher values along the data density axis may indicate greater complexity or detail present at that height, which may benefit from additional imaging to properly capture sufficient detail or merit adding a layer in a focus stack or 3D process. The density may indicate the depth of layers in the sample and the span of depths may show the thickness of the sample. The processor may be configured to image regions of the sample with higher data density at higher resolution. Alternatively or in combination, the processor can be configured to process data from the regions of the sample with increased data density in order to provide images with sufficient resolution. Also, the process can be configured not to image regions of the image with lower data density, for example regions of the image below a threshold amount. This can provide images with increased resolution, proper representation of the layers of data, and decreased scan time and storage for the images.

The data density may correspond to sample structure. The image capture settings may be based on, for example, heights corresponding to local peaks in the graph. By prioritizing image capture based on the local peaks, detailed areas of sample 114 may be captured. In other words, the local peaks in FIG. 5 may correspond to ROIs, and the 3D process can be directed toward the peaks of data density in the attribute.

Figure 6A:
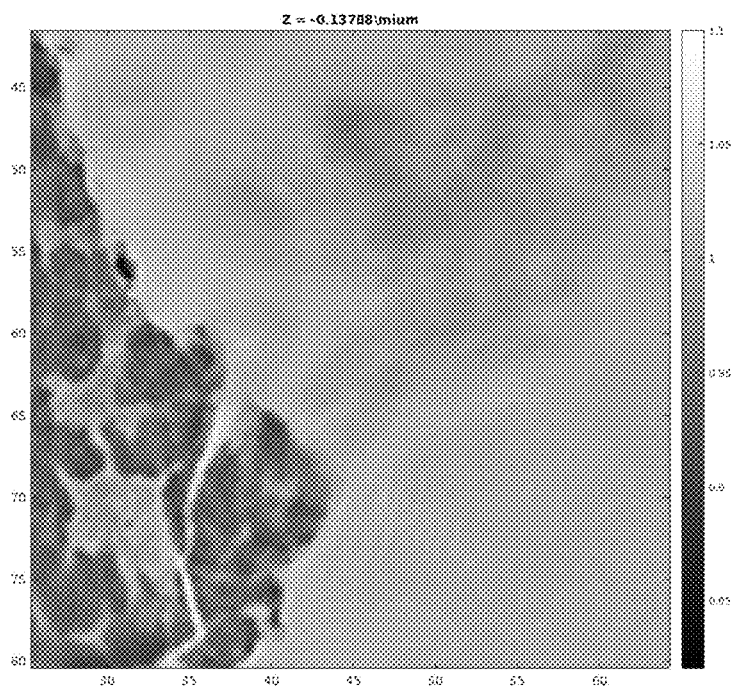
FIG. 6A is an illustration of exemplary image data acquired at a first depth, in accordance with some embodiments of the present disclosure.
Figure 6B:
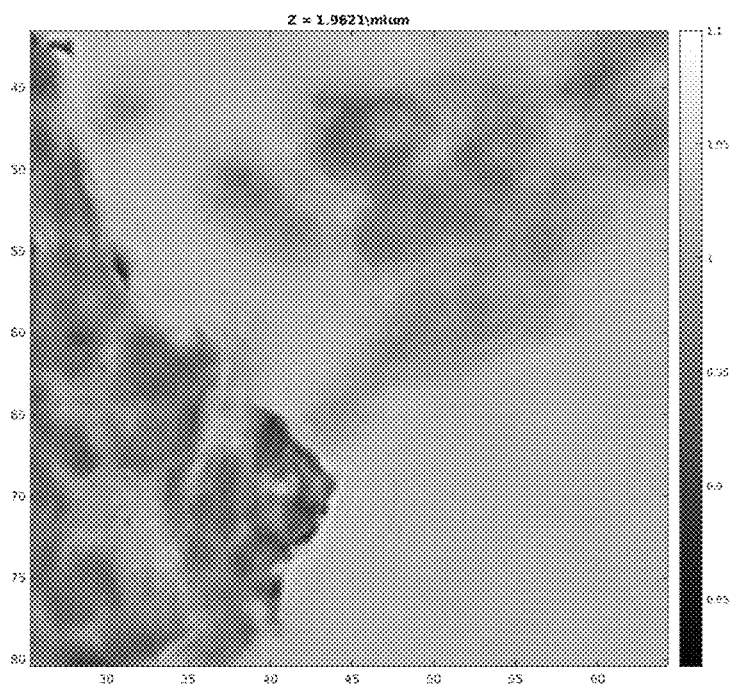
FIG. 6B is an illustration of exemplary image data acquired at a second depth, in accordance with some embodiments of the present disclosure.
Figure 6C:
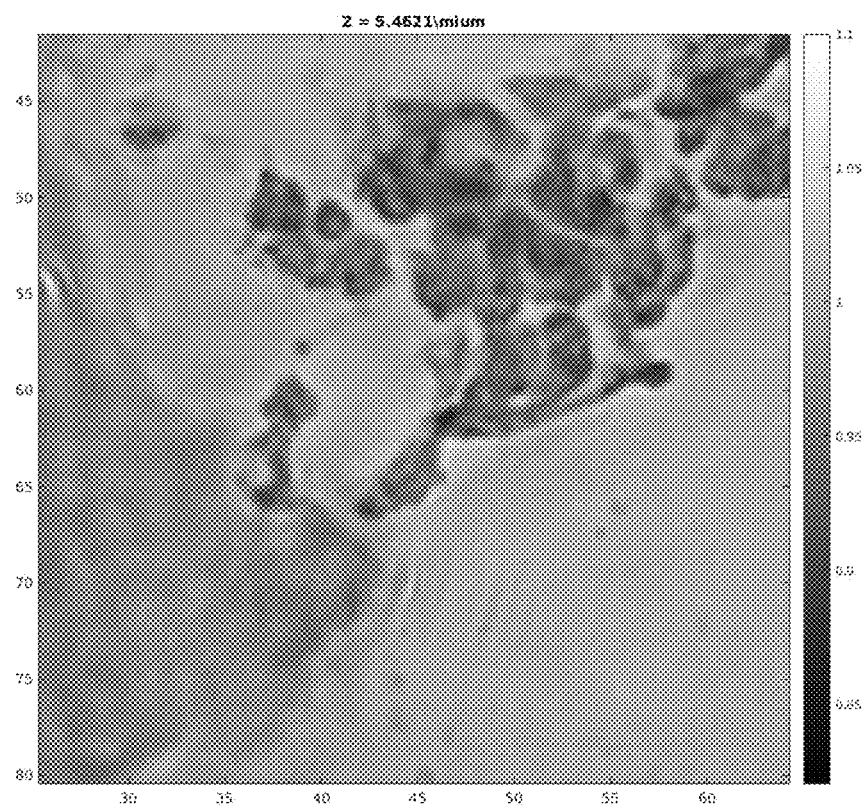
FIG. 6C is an illustration of exemplary image data acquired at a third depth, in accordance with some embodiments of the present disclosure.

FIGS. 6A to 6C show images from a 3D reconstruction based on the attribute shown in graph 500. Each image corresponds to a layer in the sample. As can be seen in the figures, there may be good agreement between the data density in the graph and the data in the images of the sample. These images may also be used to demonstrate how the attribute may be determined from a focus stack. In this example, the images may be images taken at different heights, as part of the initial image set. Capturing images at different focal planes may capture different features, which may be used to determine the attribute of the sample. For example, in FIG. 6A, a feature on the left of the image may be in focus and sufficiently captured, whereas a feature on the upper right of the image may be out of focus, insufficiently captured, or tissue from the sample not present at the corresponding depth. In contrast, in FIG. 6C, the feature on the upper right may be in focus and sufficiently captured, whereas the feature on the left may be out of focus, insufficiently captured, or tissue from the sample not present at the corresponding depth. The images shown in FIG. 6B is at an intermediate depth as compared with the depth of images FIGS. 6A and 6C. Thus, by determining the attribute comprising the data density in the initial image set at different locations, the 3D process can be adapted to image regions with higher amounts of data density in order to provide an output image with higher resolution and decreased time. Although FIGS. 6A to 6C are shown with respect to a substantially fixed lateral location, additional lateral locations can be scanned with a mosaic or tile pattern or a line scan or staggered line scan at each of a plurality of depths in order to determine the attribute and regions to be subsequently scanned with the adaptive 3D process as described herein.

FIGS. 7A-7F illustrate different configurations of microscope 100 for determining phase information under a variety of illumination conditions. According to one embodiment that may be implemented in the configuration of FIG. 7A, microscope 100 may comprise illumination assembly 110, focus actuator 104, lens 202, and image sensor 200. In this embodiment, controller 106 may acquire a group of images from different focal-planes for each illumination condition, which may be compared to determine the attribute.

Figure 7A:
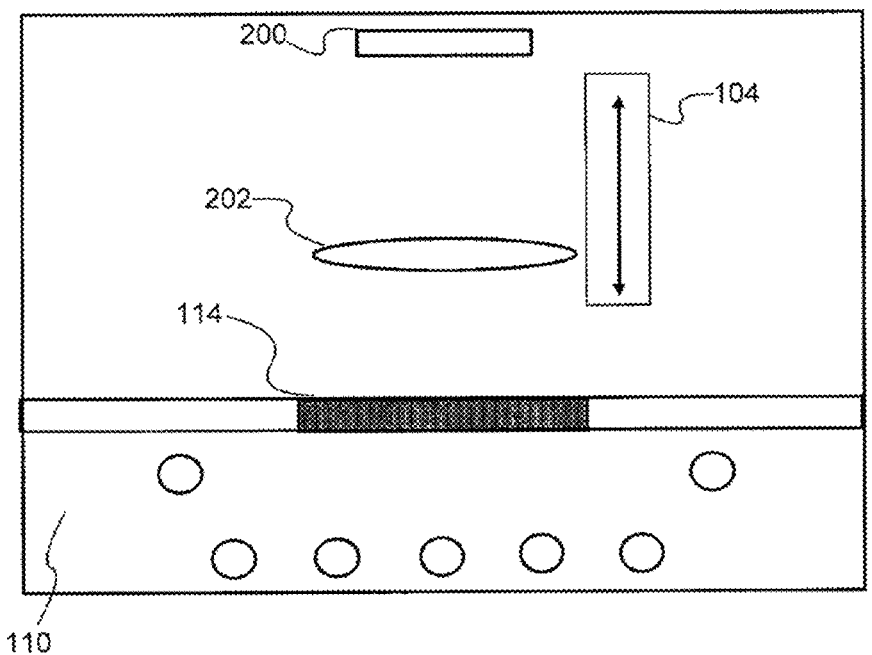
FIG. 7A is a diagram of a configuration for a plurality of illumination conditions, in accordance with some embodiments of the present disclosure.
Figure 7B:
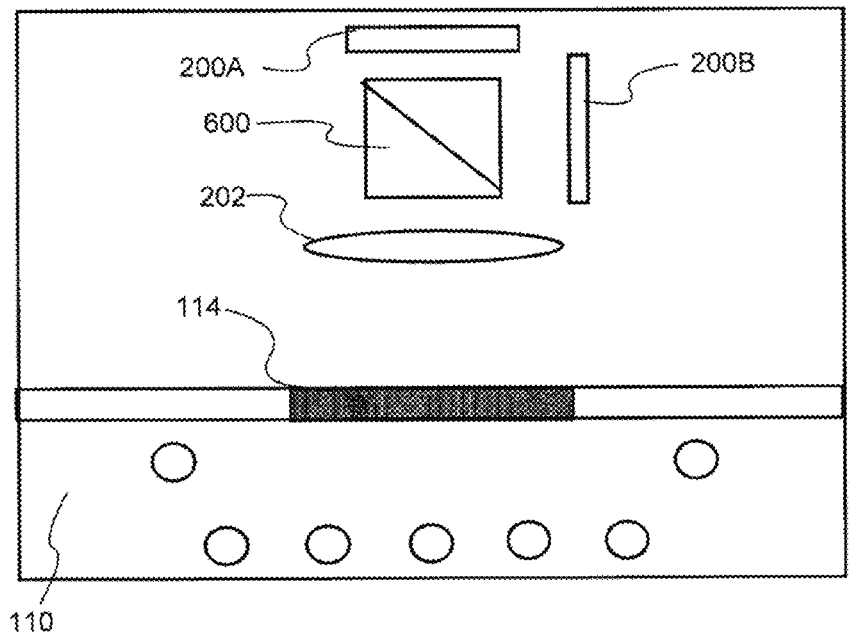
FIG. 7B is a diagram of a configuration for a plurality of illumination conditions, in accordance with some embodiments of the present disclosure.

According to another embodiment that may be implemented in the configuration of FIG. 7B, microscope 100 may comprise illumination assembly 110, lens 202, a beam splitter 600, a first image sensor 200A, and a second image sensor 200B. In this embodiment, first image sensor 200A and second image sensor 200B may capture different types of images, and controller 106 may combine the information from first image sensor 200A and second image sensor 200B. In one example, image sensor 200A may capture Fourier-plane images and second image sensor 200B may capture real-plane images. Accordingly, controller 106 may acquire, for each illumination condition, a Fourier-plane image from first image sensor 200A and a real-plane image from second image sensor 200B. Therefore, controller 106 may combine information from the Fourier-plane image and the real-plane image in order to determine the attribute. In another example, image sensor 200A may be configured to capture focused images and second image sensor 200B is configured to capture unfocused images. It is also possible that additional sensors may be added. For example, 2, 3 or more different sensors may be configured to capture images in 2, 3 or more different focal planes simultaneously.

Figure 7C:
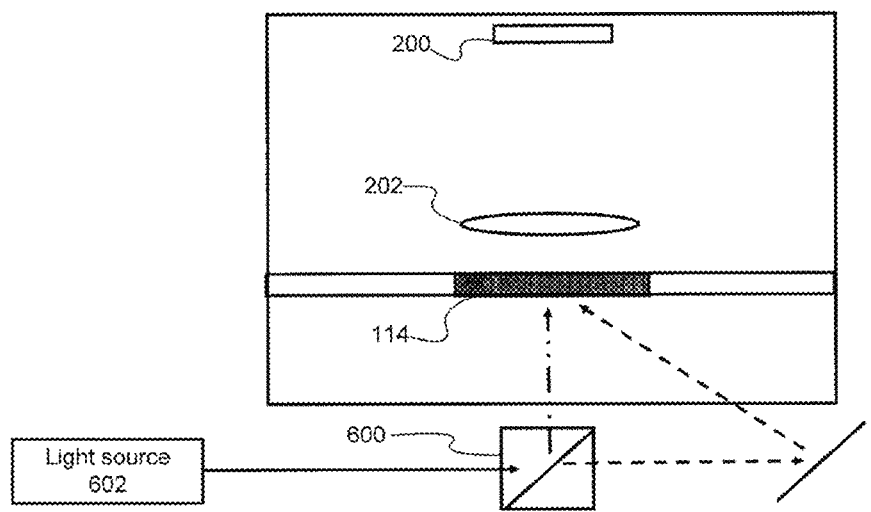
FIG. 7C is a diagram of a configuration for a plurality of illumination conditions, in accordance with some embodiments of the present disclosure.
Figure 7D:
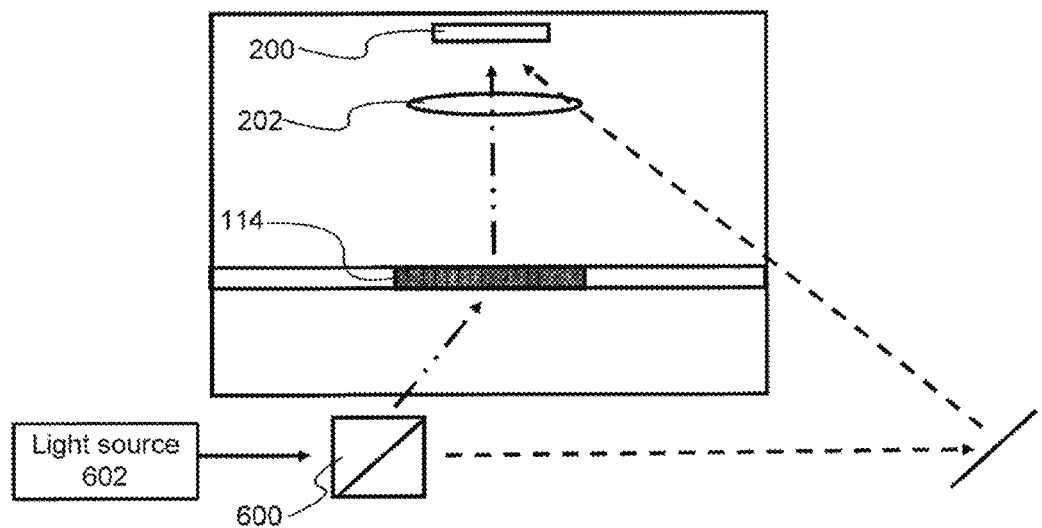
FIG. 7D is a diagram of a configuration for a plurality of illumination conditions, in accordance with some embodiments of the present disclosure.

According to another embodiment that may be implemented in the configurations of FIG. 7C and FIG. 7D, microscope 100 may comprise a light source 602, a beam splitter 600, lens 202, and image sensor 200. In this embodiment, light source 602 may project a light beam (coherent or at least partially coherent) towards beam splitter 600, the beam splitter generates two light beams that travel through two different optical paths and create an interference pattern. In the configuration of FIG. 7C, the interference pattern is created on sample 114, and in FIG. 7D, the interference pattern is created on image sensor 200. In the case presented in FIG. 7D, controller 106 may identify, for each illumination condition, the interference pattern between the two light beams traveling through the different optical paths, and determine, from the interference pattern, the attribute.

Figure 7E:
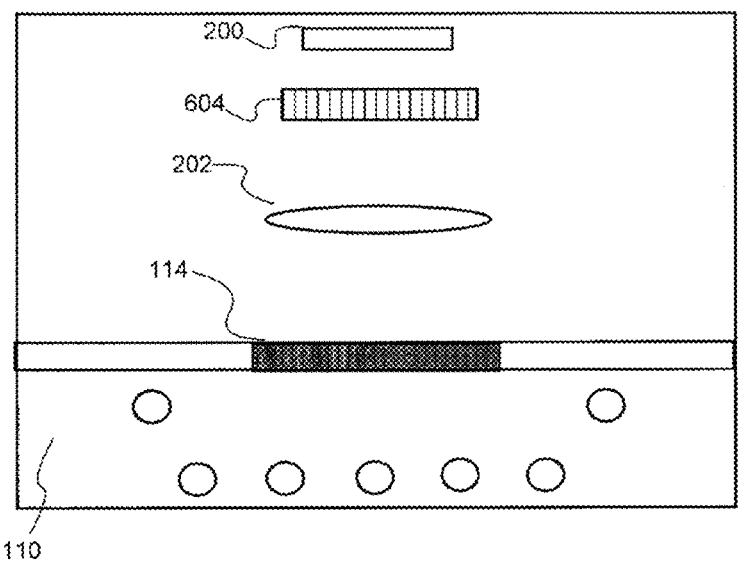
FIG. 7E is a diagram of a configuration for a plurality of illumination conditions, in accordance with some embodiments of the present disclosure.
Figure 7F:
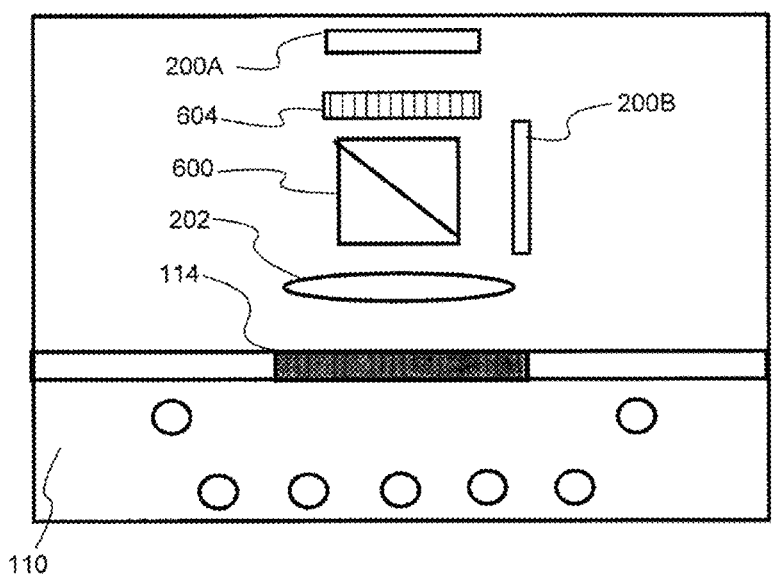
FIG. 7F is a diagram of a configuration for a plurality of illumination conditions, in accordance with some embodiments of the present disclosure.

According to yet another embodiment that may be implemented in the configurations of FIG. 7E and FIG. 7F, microscope 100 may comprise illumination assembly 110, lens 202, an optical element 604, and at least one image sensor 200. In this embodiment, optical element 604 is configured to impose some form of modulation on the light received from sample 114. The modulation may be imposed on the phase, the frequency, the amplitude, or the polarization of the beam. In the configuration illustrated in FIG. 7E, microscope 100 may comprise a dynamic optical element, such as spatial light modulator (SLM), that may dynamically change the modulation. Controller 106 may use the different information caused by the dynamic optical element to determine the attribute.

Alternatively, in the configuration illustrated in FIG. 7F, microscope 100 may comprise a fixed optical element, such as phase-shift mask, beam splitter 600, first image sensor 200A, and second image sensor 200B. Controller 106 may combine information from first image sensor 200A and second image sensor 200B to determine the phase information under each illumination condition.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or comprise additional steps in addition to those disclosed.

The processor as disclosed herein can be configured to perform any one or more steps of a method as disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising." The terms "based on" and "in response to" are used interchangeably in the present disclosure.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A microscope comprising:
an illumination assembly;
an image capture device configured to collect light from a sample illuminated by the illumination assembly; and
a processor configured to execute instructions which cause the microscope to:
capture, using the image capture device, an initial image set of the sample;
identify, by the processor in response to the initial image set, an attribute of the sample by performing analysis on the initial image set independently from a user, wherein the attribute is indicative of the sample extending beyond a single focal plane;
determine, in response to identifying the attribute, a three-dimensional (3D) process by determining, using the attribute, that the sample extends beyond the single focal plane and selecting the 3D process, from a plurality of 3D processes, capable of capturing the sample with more than one focal plane; and
generate, using the determined 3D process, an output image set comprising the more than one focal plane.

2. The microscope of claim 1, wherein the 3D process comprises capturing one or more subsequent images of the sample using one or more illumination conditions of the illumination assembly and one or more image capture settings for the image capture device.

3. The microscope of claim 2, wherein a number of illumination conditions for the 3D process is greater than a number of illumination conditions for capturing the initial image set.

4. The microscope of claim 2, wherein the 3D process comprises determining a plurality of focal planes for capturing the one or more subsequent images based at least on the attribute, and the one or more illumination conditions and the one or more image capture settings correspond to the plurality of focal planes.

5. The microscope of claim 2, wherein the one or more subsequent images are taken at one or more locations of the sample determined based at least on the attribute.

6. The microscope of claim 2, wherein the 3D process comprises performing a 3D reconstruction of the sample based at least on a subset of images captured by the image capture device.

7. The microscope of claim 2, wherein the 3D process comprises performing a 2.5D reconstruction of the sample based at least on a subset of images captured by the image capture device in order to generate 3D data from the sample.

8. The microscope of claim 2, wherein the 3D process comprises performing focus stacking for the sample based at least on a subset of images captured by the image capture device.

9. The microscope of claim 8, wherein the 3D process comprises capturing a plurality of images at a respective plurality of focal planes.

10. The microscope of claim 1, wherein identifying the attribute comprises estimating the attribute corresponding to one or more locations of the sample.

11. The microscope of claim 1, wherein the 3D process is performed within a threshold time from capturing the initial image set.

12. The microscope of claim 1, wherein the attribute comprises a thickness of the sample at one or more locations of the sample.

13. The microscope of claim 1, wherein the attribute comprises a depth of the sample at one or more locations of the sample.

14. The microscope of claim 1, wherein the 3D process comprises capturing images at a plurality of distances between the image capture device and the sample, and a number of focal planes for the 3D process is greater than a number of distances in the plurality of distances.

15. The microscope of claim 1, wherein capturing the initial image set comprises capturing the initial image set of the sample using a plurality of illumination conditions for illuminating the sample, and the plurality of illumination conditions comprises at least one of an illumination angle, an illumination wavelength, or an illumination pattern.

16. The microscope of claim 1, wherein the 3D process comprises capturing one or more subsequent images of the sample using a plurality of illumination conditions for illuminating the sample, and the plurality of illumination conditions comprises at least one of an illumination angle, an illumination wavelength, or an illumination pattern.

17. The microscope of claim 1, wherein the 3D process comprises a plurality of focus levels for adjusting the image capture device.

18. The microscope of claim 1, wherein the attribute comprises at least one of a thickness, a density, a depth, a color, a stain structure of the sample, a distance from a lens of the image capture device, a plurality of distances between the lens of the image capture device and the sample, a plurality of focal planes of the sample in relation to the image capture device, a sample structure, a convergence value, a pattern, or a frequency determined based at least on one of color analysis, analysis of optical aberrations, computational reconstruction, pattern recognition, Fourier transformation, or light field analysis.

19. The microscope of claim 18, wherein the sample is stained and the color analysis comprises determining the attribute for an area of the sample based at least on comparing a color or stain structure of the area with a color or stain structure of another area of the sample.

20. The microscope of claim 19, wherein identifying the attribute comprises determining, using pattern recognition, the attribute of the sample.

* * * * *